Aug. 21, 1934.  D. BRUZON  1,970,595
FLEXIBLE CABLE UNIT AND MEANS FOR APPLYING CONNECTING MEMBERS THERETO
Filed Nov. 17, 1933  2 Sheets-Sheet 1
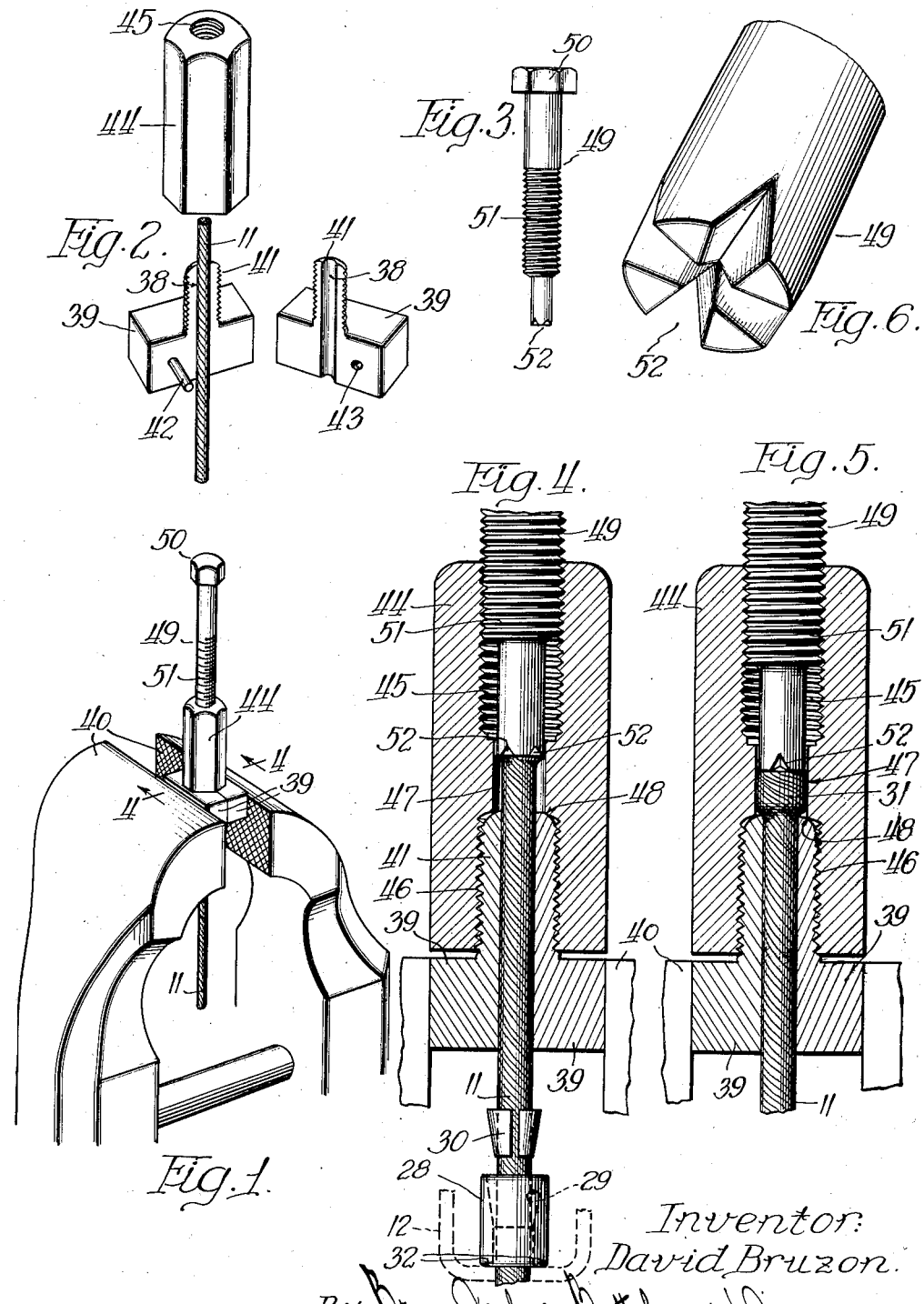
Inventor:
David Bruzon.
By Brown, Jackson, Boettcher + Dienner
Attys.

Aug. 21, 1934.  D. BRUZON  1,970,595
FLEXIBLE CABLE UNIT AND MEANS FOR APPLYING CONNECTING MEMBERS THERETO
Filed Nov. 17, 1933   2 Sheets-Sheet 2
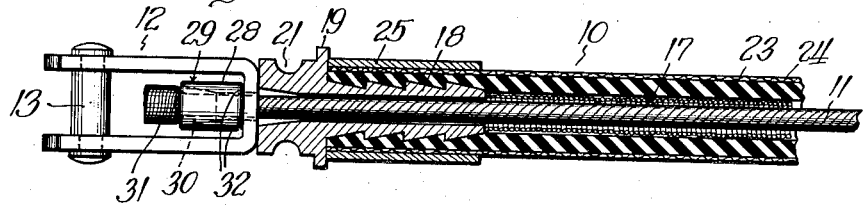
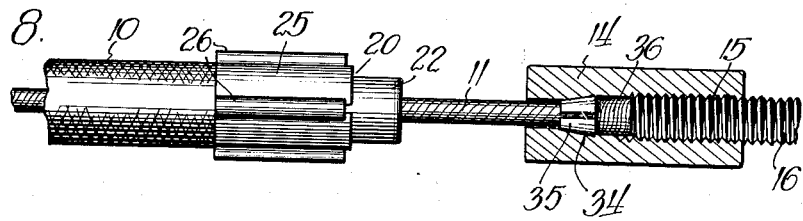
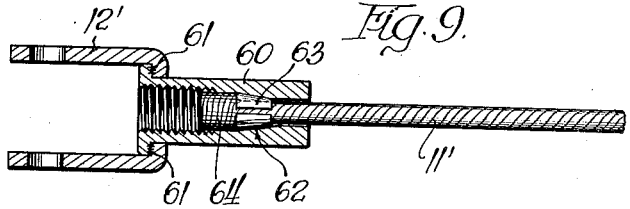
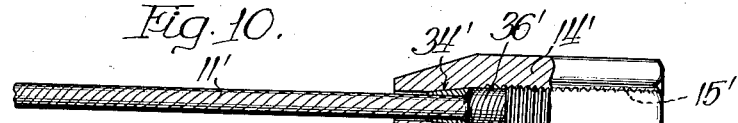
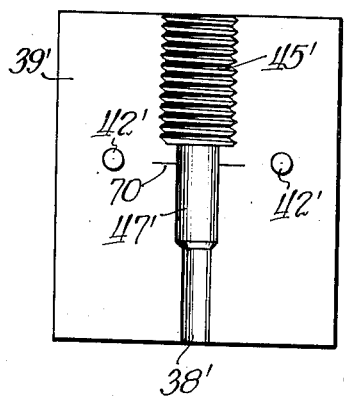
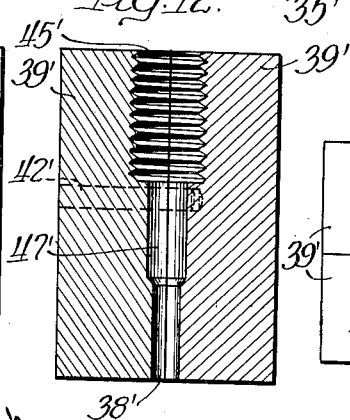
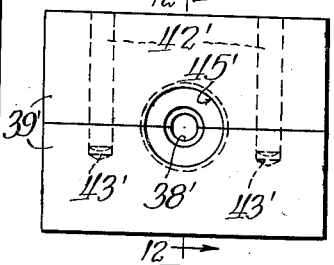
Inventor:
David Bruzon.
By Brown, Jackson, Boettcher & Dienner Attys Patented Aug. 21, 1934

1,970,595

UNITED STATES PATENT OFFICE 1,970,595

FLEXIBLE CABLE UNIT AND MEANS FOR APPLYING CONNECTING MEMBERS THERETO

David Bruzon, Chicago, Ill.

Application November 17, 1933, Serial No. 698,422

3 Claims. (Cl. 24—125)

This invention relates to flexible cable units for brake operating cable and conduit assemblies, and to a method of and means for applying the yokes or other connecting members to the ends of such cable units.

Brake operating connections of this sort are connected between the frame of the car and the wheel, and consist of a flexible conduit or casing in which a flexible cable operates for actuating the brake from the brake pedal or other actuator and taking care of movement between the wheels and frame.

While I have illustrated and described the invention in connection with the brake operating connection more fully disclosed in my copending application Serial No. 675,366, filed June 12, 1933, and in connection with certain types of connecting members, it is to be understood that the invention is not limited to the particular brake operating connection or to the particular connecting members illustrated and described.

The application of these connecting members to flexible cable units of this sort has heretofore been difficult and costly. The usual method has been to swedge and spot weld to the cable these connecting members or suitable collars for cooperation therewith to provide sufficient strength and permanency of the fastening of the connecting members or cooperating collars to the cable. This involves the use of large, costly presses, and other costly equipment, all of which has made the original assembly difficult and expensive. And it has rendered renewal or replacement of the cable units equally difficult and expensive, with the result that, instead of making such renewal or replacement of the cable unit only, the entire cable and conduit assembly has usually been replaced wherever the cable unit is worn out or otherwise rendered unfit for further use.

The object of my present invention is to provide an improved cable unit, and particularly an improved connection between the connecting member and the end of the cable; and an improved method of and means for applying such connecting member, all to the end of simplifying the connection and making same less costly and enabling formation of the connection and renewal and replacement of the cable unit without large costly presses or other costly equipment and by practically any brake service station attendant.

The features and advantages of the invention will be apparent from the following detailed description taken in connection with the accompanying drawings, in which:

Figure 1 is a perspective view showing one form of means for and the manner of applying the connecting member to the cable in accordance with the present invention;

Figure 2 is an exploded perspective view of the cable gripping blocks and tool receiving sleeve of the connecting member applying means shown in Figure 1;

Figure 3 is an elevational view of the tool for compressing and twisting the strands at the end of the cable;

Figure 4 is an enlarged vertical section taken on the line 4—4 of Figure 1 and showing the tool for compressing and twisting and knotting the end of the cable at the beginning of its compressing and twisting and knotting operation;

Figure 5 is an enlarged section, similar to Figure 6, showing the compressing and twisting member at the end of the compressing and twisting operation;

Figure 6 is a fragmentary perspective view showing one form of serrated end for the cable compressing and twisting tool;

Figure 7 is a fragmentary longitudinal section through one form of flexible brake operating connection showing one form of wheel connecting member connected to the cable in accordance with the present invention;

Figure 8 is a fragmentary elevational view of the opposite end of the flexible brake operating connection of Figure 7 showing one form of frame connecting member connected to the opposite end of the cable in accordance with the present invention;

Figure 9 is a fragmentary view, partially in section and partially in elevation, showing another form of wheel connecting member connected to the cable in accordance with this invention;

Figure 10 is a fragmentary longitudinal section showing the frame connector at the opposite end of the cable of Figure 9 connected to the cable in accordance with this invention;

Figure 11 is a plan view of another form of means for gripping the cable and for receiving the member for compressing and twisting and knotting together the strands at the end of the cable;

Figure 12 is a vertical section taken on the line 12—12 of Figure 11; and

Figure 13 is an elevational view of one of the cable gripping and deforming member receiving blocks shown in Figures 11 and 12.

Referring to the drawings, the device shown in Figures 7 and 8 is of the type more fully disclosed in my copending application hereinbefore identified. It comprises a flexible conduit designated in its entirety at 10, and a cable 11 extending through the conduit. The flexible conduit 10 constitutes the incompressible member of the device, and the cable 11 constitutes the inextensible tension element as well understood in the art.

The cable 11 is freely movable longitudinally in the conduit 10 and has, at one end, a yoke 12 extending between and secured in the arms of which is a rivet 13 for connection with brake shoe operating means at the wheel. The opposite end of the cable 11 has a connecting member 14 for threaded engagement at 15 with the adjacent pull rod 16 of the brake actuating linkage on the frame of the vehicle.

The flexible conduit 10 comprises a spring 17, the turns of which are closely wound and maintained in contact with each other in all angular positions assumed by the conduit. The opposite ends of the spring 17 abut the adjacent ends of extending grooved necks 18 formed integral with end members 19 and 20. The end member 19 has an annular groove 21 for attachment of this end member to the wheel, and the member 20 has an extension 22 for attachment to the vehicle frame. The spring 17 is covered by a relatively thick-walled flexible rubber tube 23, the opposite ends of which fit over the externally grooved neck extensions 18. The tube 23 may be covered with a thin woven, or other suitable fabric covering 24, and the ends of this covering are secured to the tube 23, and the ends of the tube 23 clamped securely upon the neck extensions 18 by metal clamping bands 25 contracted tightly about the ends of the conduit as by means of longitudinal crimps 26.

The connecting member 12 includes the yoke part with the rivet 13 between the arms thereof and a collar part 28 the opening through which is tapered at 29 for coaction with the tapered periphery of a wedge 30, which wedge is interposed between the tapered bore of the collar 28 and the headed end 31 of the cable 11. The collar 28 may be separate from the yoke part of the connecting member 12, but, for convenience in handling, is preferably spot welded thereto at 32.

The opening through the connecting member 14 is tapered at 34 for coaction with the tapered periphery of a wedge 35 similar to wedge 30. This wedge 35 being placed upon the cable 11 and interposed between the inside taper in the member 14 and the headed end 36 of the cable. The wedge members 30 and 35 are preferably in the form of longitudinally split collars externally tapered for cooperation with the taper inside the collar 28 and with the taper inside the connecting member 14. These split collars are preferably formed of brass, copper, lead, or some other metal which is softer than the headed ends of the cable and softer than the collar 28 and connecting member 14, so that, in operation, the relatively soft wedges are pressed into tight secure engagement with the tapers 29 and 34, and the enlarged cable ends are pressed into tight secure engagement and embedded in the relatively soft wedge members.

In the use of flexible brake operating connections of this sort, I find that the cable 11 is the first part to wear out and render the device unfit for further use. Heretofore, because of the difficulty and apparatus required to apply the connecting members to the ends of such a cable, the entire device including the flexible conduit has usually been replaced.

With the present invention, however, the cable may be replaced by practically any brake service station attendant and without discarding the flexible conduit part and without a large press or other expensive apparatus. This is accomplished by merely severing the old cable and removing it from the conduit and dividing the new cable into the desired length. One end of this new cable 11 is then placed in grooves 38 in the inner faces of a pair of clamping blocks 39, which blocks 39 may be gripped, for example, in a vise 40 to clamp the cable 11 firmly in place between the blocks 39 with the upper end of the cable extending above the split and externally threaded neck part 41 a distance sufficient to form the desired enlargement on the end of the cable. One-half of the split and externally threaded neck part 41 is formed on one of the blocks 39 and the other half is formed on the other block. These blocks 39 are doweled together by engagement of a dowel pin 42 on one block in a dowel socket 43 in the other block.

A sleeve 44, formed externally to polygonal form or otherwise for engagement by a wrench or other tool, has at its opposite ends coaxial threaded bores 45 and 46 connected by an intermediate bore 47. The cable end enlargement is formed in this intermediate bore 47, and its diameter therefore corresponds with the diameter of such cable end enlargement. With the end of the cable gripped between the blocks 39, the sleeve 44 is threaded down upon the split neck part 41 until the shoulder 48, within the sleeve, is firmly seated upon the upper end of the neck part 41. This positions the bore 47 adjacent the end of the cable which extends above the neck part 41.

The tool for deforming the cable end to enlarge the same and to twist and knot the wire strands of the cable tightly together at the enlargement comprises a screw 49 headed at 50 for engagement by a wrench, and the shank of this screw 49 is threaded at 51 for threaded engagement in the upper threaded bore 45 of the sleeve 44. Below the threaded portion 51 the shank of the tool is reduced to a diameter to fit snugly in the more 47, and the lower end of this reduced part of the shank has teeth or edges 52 adapted to bite into the end of the cable and to twist and knot together the strands of the cable as the tool is threaded down into the sleeve 44. The toothed or serrated formation at the inner end of the reduced part of the shank of the tool is shown in Figure 6. This particular formation is suitable for the purpose described but may, of course, vary widely within the scope of the present invention.

The sleeve 44 may be applied by hand by means of a suitable wrench, and the tool 49 is, likewise, threaded into the sleeve 44 by hand as by means of a suitable wrench. As the reduced lower end of the tool enters the intermediate bore 47 it compresses the end of the cable 11 above the neck part 41 ahead of it it, and spreads the end of the cable out to the diameter of the bore 47 and compacts the enlargement down tightly upon the upper end of the neck part 41. Simultaneously with this spreading and axial compressing of the end of the cable the edges 52, in the end of the tool, bite into the end of the cable and twist and knot tightly together the strands of the cable at the enlargement 36. This twisting and knotting of the strands of the cable together at the enlargement secures the same against opening under the pulling stresses in the operation of the cable on the car and greatly enhances the holding power of the enlargement.

With the enlargement 36 thus formed on one end of the cable, the wedge member 35 is slipped into place over the opposite end of the cable and the connecting member 14, for example, is then slipped into place also over the opposite end of the cable. With the enlargement 36 thus formed and the connecting member 14 and intervening wedge 35 applied, the cable is passed through the conduit means 10, whereupon the connecting member 12 and wedge 30 are slipped over the opposite end of the cable, which end is then gripped between the blocks 39 beyond the wedge 30 and deformed by the tool 49 to form the enlargement 31 and to twist and knot the strands of the cable together at said enlargement 31 in the manner described in connection with the formation of the enlargement 36. This completes the application of the new cable unit, and it will be apparent from the foregoing description that the end members 12 and 14 are applied to the ends of the cable 11 by hand with simple and inexpensive tools and without large costly presses or other expensive equipment. The attachment of these cable ends in accordance with this invention will withstand a pull of at least 2,800 pounds without pulling out the enlargement or pulling off the connecting member. The pitch of the threads 51 on the shank of the tool 49, and the pitch of the cooperating threads 45 in the sleeve 44 are preferably very slight in order to more effectively and completely twist and knot together the strands of the cable ends throughout the enlargements 36 and 31.

The blocks 39 are preferably not of great height so that they may be clamped upon the end of the cable with the conduit means on the cable and with the clearance usually provided between the connecting members and the ends of the conduit means.

Where this clearance is not so great, the sleeve part 44 of Figures 1, 2, 4 and 5 may be omitted, and the threaded socket 45', for the tool 49, may be formed directly in the clamping blocks 39', as shown in the modification of Figures 11, 12 and 13. In this case, the semi-circular grooves for receiving and clamping the cable are shown at 38', and the bore 47' in which the cable end is deformed is formed in the blocks 39' between the upper ends of the grooves 38' and the lower end of the threaded socket 45'. The blocks 39' are doweled together by dowel pins 42' secured to one block and engaging in dowel sockets 43' in the other block.

The ends of the cable are enlarged and the strands twisted and knotted together at the enlargements with the blocks of Figures 11, 12 and 13 and the tool 49 similar to the manner described in connection with Figures 1 to 6, inclusive, except that, in this case, the tool 49 is threaded directly into the blocks 39' which may be clamped together as, for example, in a vise, and the projecting end of the cable is enlarged and the strands thereof twisted and knotted together in the bore 47' in the blocks 39', instead of in the sleeve 44 as in previous embodiment. This enables omission of the sleeve 44 and adapts the cable end enlarging and twisting means for use with relatively restricted clearances between the ends of the conduit means and the connecting members on the ends of the cable. Proper positioning of the cable may be secured by registering the upper end of the cable with a mark 70 on one of the blocks 39'.

In Figure 9, I have shown another form of connecting member 12' for attachment to the brake actuating mechanism at the wheel, and in Figure 10 I have shown another form of connecting member 14' at the opposite end of the cable for attachment to the brake actuating linkage on the frame of the vehicle. The member 12' comprises the yoke part and a thimble 60 having a shank portion passing through an opening in the base of the yoke part and a headed end which may be spot welded at 61 to the base of the yoke part. The opening through the thimble 60 is tapered at 62 for engagement with the externally tapered and longitudinally split wedge sleeve 63 which is interposed between the taper 62 inside the thimble 60 and the headed enlargement 64 at the end of the cable 11', this headed enlargement 64 being formed in the manner previously described.

The connecting member 14' at the opposite end of the cable 11' is similar to the connecting member 14 of the previous embodiment. It is adapted for connection to the brake operating means on the frame of the vehicle and the opening therethrough is tapered at 34' for cooperation with the wedge member 35' interposed between the taper 34' and the enlarged end 36' of the cable, and beyond the taper 34' the opening through the member 14' is threaded at 15' for threaded engagement with the adjacent pull rod of the brake actuating means on the frame.

I claim:
1. In combination, means for gripping a cable at a distance from one end to leave the end of the cable projecting beyond said gripping means and for forming a pocket about the projecting cable end, and a tool having threaded engagement with said last means, said tool having an end adapted to compress the projecting cable end in said pocket to form an enlargement and having biting engagement with the cable end for simultaneously twisting and knotting together the strands of the cable at said enlargement.

2. In combination, a pair of clamping blocks for gripping a cable at a distance from one end to leave the end of the cable projecting beyond said gripping means, split neck parts on said blocks, a sleeve threaded on said split neck parts and having a bore forming a pocket adjacent the projecting cable end, and a tool having threaded engagement in said sleeve and an end adapted to compress the projecting cable end in said pocket to form an enlargement and having biting engagement with the cable end for simultaneously twisting and knotting together the strands of the cable at said enlargement.

3. In combination, a pair of clamping blocks for gripping a cable at a distance from one end to leave the end of the cable projecting beyond said gripping means, said blocks having a bore forming a pocket adjacent the projecting cable end, and a tool having threaded engagement in said blocks and an end adapted to compress the projecting cable end in said pocket to form an enlargement and having biting engagement with the cable end for simultaneously twisting and knotting together the strands of the cable at said enlargement.

DAVID BRUZON.